United States Patent
Poensgen 4,061,418

Dec. 6, 1977

[54] LIQUID-CRYSTAL DISPLAY WITH POLARIZER, AND METHOD OF MAKING THE SAME

[75] Inventor: Rudolf Poensgen, Munich, Germany

[73] Assignee: Siemens Aktiengesellschaft, Berlin & Munich, Germany

[21] Appl. No.: 728,294

[22] Filed: Sept. 30, 1976

[30] Foreign Application Priority Data

Oct. 7, 1975 Germany .............................. 2544940

[51] Int. Cl.² ................................................. G02F 1/13
[52] U.S. Cl. .................................. 350/160 LC; 350/67; 350/155; 350/320
[58] Field of Search ................. 350/160 LC, 67, 155, 350/320

[56] References Cited

U.S. PATENT DOCUMENTS

| 3,859,131 | 1/1975 | Miles | 350/67 X |
| 3,869,196 | 3/1975 | Kubota | 350/160 LC |
| 4,025,688 | 5/1977 | Nagy et al. | 350/155 X |

*Primary Examiner*—Edward S. Bauer
*Attorney, Agent, or Firm*—Hill, Gross, Simpson, Van Santen, Steadman, Chiara & Simpson

[57] ABSTRACT

A liquid-crystal display having two carrier plates, between which a liquid crystal material is enclosed in hermetically sealed relation, and which have respective electrode coatings on their inner surfaces, at least one carrier plate having a polarizer disposed on the outer surface thereof, comprising a chemically inert, transparent and optically inactive protective foil and a dichroitic layer disposed between the protective foil and the carrier plate, with the marginal edges of the polarizer being covered with coating means for sealing the dichroitic layer from atmospheric influences, particularly humidity, and method of making the same.

8 Claims, 1 Drawing Figure

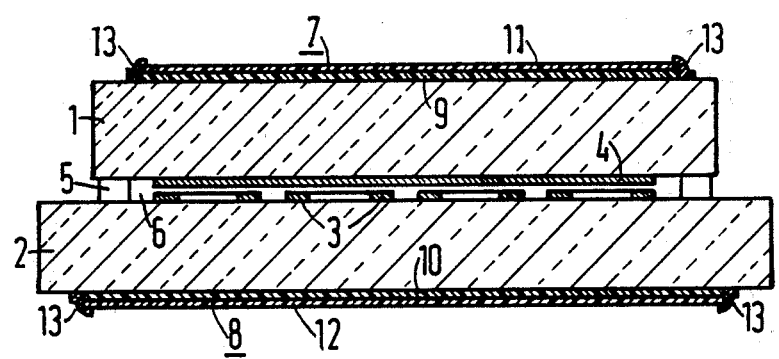

LIQUID-CRYSTAL DISPLAY WITH POLARIZER, AND METHOD OF MAKING THE SAME

BACKGROUND OF THE INVENTION

The invention relates to a liquid-crystal display employing two carrier plates, between which is disposed a liquid-crystal layer which is hermetically sealed therebetwen, with the plates having respective electrode coatings on their inner surfaces, and in which at least one carrier plate has a polarizer disposed on its outer surface comprising a chemically inert, transparent and optically inactive protective foil and a dichroitic layer disposed between the protective foil and the associated carrier plate. Such display structures are known, for example from U.S. Letters Pat. No. 3,731,986. See also Appl. Phys. Lett. Vol. 18, No. 4, Pages 127 and 128, regarding operation of such displays.

To enable utilization of different field effects, for example the TN effect (twisted nematic), the DAP (deformation of aligned phases), the bistability effect or the so-called guest-host effect, as well as in certain other display principles, it is required or useful, to provide the liquid-crystal cell with at least one polarizer. Usually, the liquid-crystal cell is disposed between two linear polarizers with such polarizers normally containing a dichroitic layer as the polarization-active material, for example a stretched poly-vinyl alcohol, colored with iodine, which is protected from surrounding influences by a protective foil covering layer composed of a chemically inert, transparent and optically inactive materials, both layers are integrated with the supporting plate to form a multi-layer structure, preferably with a suitable glue inserted between the dichroitic layer and the plate.

Experience has indicated that polarizers heretofore employed possess certain inherent faults. For example, the glue as well as the dichroitic layer lose their shape in the course of time with both materials slowly expanding whereby they may lift off of the plate, and in addition the polarization force of the dichroitic layer, which may be color-selective, slowly disappear whereby the display qualities steadily deteriorate whereby the display may be unusable after merely a few weeks time.

BRIEF SUMMARY OF THE INVENTION

In accordance with the invention, the above-referred to disadvantages of a liquid-crystal display of the type involved, the dichroitic layer is protected from atmospheric influences, in particular humidity, by the provision of a protective coating which covers the marginal edges of the polarizer to thereby effectively seal the same with respect to external influences. The coating preferably may comprise a lacquer, a non-hygroscopic glue, in particular an epoxy glue, a metal paste, or the like, and advantageously is applied by painting, spraying in a screen-printing technique, per se known, or by other suitable printing methods.

The invention proceeds from the observation that the quality losses and appearance changes are due primarily to the fact that the glue and the dichroitic layer, such as poly-vinyl alcohol, due to their hygroscopic properties, draw water from the environmental air and thus swell or discolor. The undesired deterioration processes thus can be prevented by effective sealing of the marginal edges of the dichroitic layer, etc. and the usual, more expensive polarizer materials are not required for such sealing. Further, the marginal sealing in accordance with the invention, may be achieved in a particularly simple manner without extensive operations or processes requiring undesirably long period of time, which renders the invention of particular advantage in mass production operations. Likewise, as the sensitive dichroitic layer is immediately protected upon the sealing thereof, warping and bending as well as optical deteriorations are avoided.

As a result of the invention, the dichroitic layer and the glue layer are effectively sealed to provide a display having a relatively long useful life.

It will be appreciated that with the favorable properties described, the sealing in accordance with the invention is superior to other possible polarizer encasements, such as the use of metalizing and soldering, or the framing of the marginal edges of the layer by means of a bending of the protective foil.

As a result of its excellent improved characteristics, a liquid-crystal indicator in accordance with the invention is particularly suitable for applications involving high humidity environments, for example as a numerical display for wrist watches and the like, which are continually exposed to an atmosphere of evaporating perspiration, etc., during their operation.

BRIEF DESCRIPTION OF THE DRAWINGS

The FIGURE of the drawing illustrates a transverse crosssection through a liquid-crystal display for the representation of multi-digit alphanumeric characters or the like, omitting for the sake of simplicity and clarity such parts of the display which do not necessarily contribute to an understanding of the invention, for example the electric supply lines, etc.

DETAILED DESCRIPTION OF THE INVENTION

The display illustrated is a so-called "rotary cell" and is operated in transmission. It employs two respective carrier plates 1 and 2 which are provided on their inner faces with suitable transparent electrode coatings, illustrated in the drawing as comprising a segmented front electrode 3 and a rear electrode 4, with the respective carrier plate being connected at their margins by a spaced glass-solder frame 5 to form a hermetically sealed structure. The chamber so formed is filled with a liquid-crystal layer 6 through a suitable filling opening in the glass-solder frame, not illustrated, or through an opening in one of the glass plates, likewise not illustrated, with the fill opening being tightly closed by means of a suitable closure material to complete the hermetically sealed structure.

Polarizer layers 7 and 8 are glued on the respective outer surfaces of the carrier plates 1 and 2. Each polarizer comprises a dichroitic layer 9 or 10, respectively, and a corresponding protective foil 11 or 12, overlying the dichroitic layer. The dichroitic layer, in accordance with the invention, is protectively sealed from environmental influences, in particular humidity, by a sealing of the marginal edges of the polarizers with a suitable sealing compound 13.

The respective components of the display may be constructed from suitable materials, for example the carrier plates may be made of glass, the electrodes 3 and 4 of $SnO_2$ or $In_2O_3$, with the glass-solder frame comprising a glass solder having a low melting point. The dichroitic layers may comprise poly-vinyl alcohol and the protective foils may be formed from cellulose acetobutyrate. The marginal sealing may utilize a plastic lacquer, for example such as offered by the Wiederhold Company under the name "Sorte A" or "Sorte O". However, a nonhygroscopic glue, for example an epoxy glue and other suitable lacquers, such as so-called "solder-stop lacquers" usually in the form of two-component lacquers on an epoxy base, may be utilized.

The marginal sealing may be readily effected by suitable operations as for example painted or sprayed on, utilizing known screen-printing techniques or other suitable printing technique.

It will be appreciated from the above that in addition to the embodiment illustrated, other suitable design constructions as well as the utilization of different representation principles may be utilized within the scope of the invention and the display may be operated, for example in reflection and/or with merely a single polarizer.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In a liquid-crystal display having two carrier plates between which a liquid crystal material is enclosed in hermetically sealed relation, and having respective electrode coatings on their inner surfaces, the combination of at least one carrier plate having a polarizer disposed on the outer surface thereof, which comprises a chemically inert, transparent and optically inactive protective foil and a dichroic layer disposed between the protective foil and the carrier plate, the marginal edges of the polarizer being covered with coating means for sealing the dichroic layer from atmospheric influences, particularly humidity.

2. A liquid-crystal display according to claim 1, wherein the coating is a lacquer.

3. A liquid-crystal display according to claim 1, wherein the coating is a non-hygroscopic epoxy glue.

4. A liquid-crystal display according to claim 1, wherein the coating is a metal paste.

5. A method of forming a polarizer for a liquid-crystal display having two carrier plates between which a liquid crystal material is enclosed in hermetically sealed relation, and having respective electrode coatings on their inner surfaces, comprising the steps of disposing a dichroic layer on the outer surface of at least one carrier plate, super-imposing a layer of a chemically inert, transparent and optically inactive protective material on said dichroic layer, and covering the marginal edges of the polarizer with a protective coating to seal the dichroic layer from atmospheric influences, particularly humidity.

6. A method according to claim 5, wherein the protective coating is applied in a screen-printing operation.

7. A method according to claim 5, wherein the protective coating is printed on.

8. A method according to claim 5, wherein the protective coating is sprayed on.

* * * * *